United States Patent Office
3,168,531
Patented Feb. 2, 1965

3,168,531
1-ARYL-5-(p-LOWER ALKOXYPHENYL)-PYRROLE-2-PROPIONIC ACID COMPOUNDS
Franklin Willard Short, Ann Arbor, Mich., assignor to Parke, Davis & Company, Detroit, Mich., a corporation of Michigan
No Drawing. Filed June 12, 1963, Ser. No. 287,211
6 Claims. (Cl. 260—326.3)

This invention relates to alkoxyphenyl compounds having a pyrrole nucleus. More particularly, it relates to 1-aryl-5-(p-lower alkoxyphenyl)-pyrrole-2-propionic acid compounds of the formula

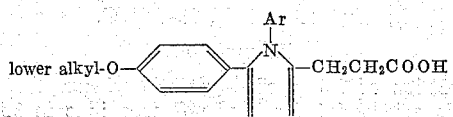

to salts and lower alkyl esters of said compounds and to methods for their production. In the foregoing formula, Ar represents o-tolyl, 3-chloro-o-tolyl, 6-chloro-o-tolyl, 2,6-xylyl, o-methoxyphenyl, p-fluorophenyl,2,5-difluorophenyl, o-methylthiophenyl, 4-fluoro-m-tolyl, α-naphthyl, or o-fluorophenyl. The lower alkyl radicals are those containing not more than 7 carbon atoms, preferably not more than 4 carbon atoms.

In accordance with the invention, 1-aryl-5-(p-lower alkoxyphenyl)-pyrrole-2-propionic acids of the foregoing formula and salts and lower alkyl esters of said compounds can be produced by reacting 6-aroyl-4-oxohexanoic acid compounds of the formula

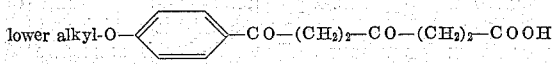

or salts or lower alkyl esters thereof with compounds of the formula <p style="text-align:center">Ar—NH$_2$</p> where Ar is as defined before. The reaction can be carried out in an unreactive solvent such as toluene, benzene, acetic acid, ethanol, aqueous ethanol, dioxane, dimethylacetamide, tetrahydrofuran, or mixtures thereof. A preferred solvent is toluene. In those cases where one of the reactants is a liquid at the reaction temperature the process can also be carried out without an added solvent. A catalyst such as p-toluenesulfonic acid, benzenesulfonic acid, ethanesulfonic acid, hydrochloric acid, sulfuric acid or other strong acid can be added to the reaction mixture. The process is normally carried out using approximately equimolar quantities of reactants, or a moderate excess of either can be used. The temperature at which the reaction is carried out is not critical. A range of approximately 50° C. to 200° C. is satisfactory, a preferred temperature being from 80° C. to 120° C. Depending on the particular reactants and the temperature, the time required for completion of the reaction varies from a few minutes to a few days. With toluene at the reflux temperature, the reaction is usually substantially complete in less than 24 hours.

The product can be isolated in the form of a carboxylic acid or a salt or lower alkyl ester thereof. The carboxylic acids can be converted to salts by reaction with a variety of organic or inorganic bases. Non-toxic salts are formed by reaction with bases such as sodium hydroxide, potassium hydroxide, calcium hydroxide, sodium carbonate, ammonia, 2-hydroxyethylamine and choline. The salts can be converted to the free carboxylic acids by treatment of an aqueous solution of the salt with a mineral acid. The carboxylic acids can be converted to their lower alkyl esters by esterification, such as by heating the carboxylic acid in a lower alkanol containing a small amount of a strong acid. The lower alkyl esters can be converted to the free carboxylic acids by hydrolysis, as by heating in aqueous methanol with sodium hydroxide or potassium hydroxide and then acidifying the mixture.

The 6-aroyl-4-oxohexanoic acids employed as starting materials in the process of the invention are known or can be prepared by general procedures already described in the literature. As an example, a p-alkoxyacetophenone is condensed with 2-furaldehyde of the formula

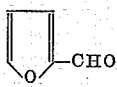

to yield a 3-(2-furyl)-4'-alkoxyacrylophenone which is then reacted with concentrated hydrochloric acid in ethanol followed by dilute aqueous acid to yield a 6-(p-alkoxybenzoyl)-4-oxohexanoic acid. The procedures are described in Berichte, 34, 1263 (1901), Journal of the Chemical Society, 1743 (1939), and various other publications. The 6-(p-alkoxybenzoyl)-4-oxohexanoic acids can be converted to their salts and lower alkyl esters by mild treatment with a base or with a mild esterifying reagent.

The compounds of the invention can also be produced by reacting a 1-aryl-5-(p-hydroxyphenyl)-pyrrole-2-propionic acid compound of the formula

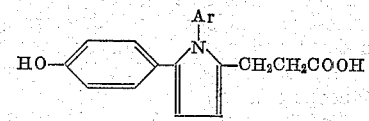

or salts or lower alkyl esters thereof with an alkylating agent; where Ar is as defined before. The alkylating agent is preferably a reactive ester of a lower alkanol such as dimethyl sulfate, ethyl iodide, propyl bromide, propyl iodide or butyl iodide. The alkylation reaction is carried out in an unreactive solvent such as a lower alkanol, water or mixtures thereof, preferably in the presence of base. At least approximately one equivalent and generally an excess of the alkylating agent is used. The temperature at which the reaction is carried out is not critical. A range of approximately 10° C. to 100° C. is satisfactory and at higher temperatures the alkylation reaction is usually substantially complete in less than 8 hours. The product can be isolated in either free acid, salt or lower alkyl ester form.

The 1-aryl-5-(p-hydroxyphenyl)-pyrrole-2-propionic acids employed as starting materials can be prepared by reacting 6-(p-hydroxybenzoyl)-4-oxohexanoic acid with an amine of the formula <p style="text-align:center">Ar—NH$_2$</p> followed by, if desired, conversion to a salt or lower alkyl ester; where Ar is as defined before.

The products of the invention are useful as pharmacological agents and as chemical intermediates. They are hypocholesteremic agents and are of value in reducing the level of blood cholesterol with comparative freedom from estrogenic side effects. They are active upon either oral or parenteral administration and oral administration is preferred. They can be employed in either free acid, salt or lower alkyl ester form depending on the solubility properties desired.

This is a continuation-in-part of application Serial No. 202,394, filed June 14, 1962, now abandoned.

The invention is illustrated by the following examples.

*Example 1*

A solution of 10.0 g. of 6-(p-methoxybenzoyl)-4-oxohexanoic acid, 4.7 ml. of 2,6-dimethylaniline and 10 mg. of p-toluenesulfonic acid in 50 ml. of toluene is heated under reflux for 16 hours with continuous removal of the water formed in the condensate. The reaction mixture is cooled and diluted with petroleum ether and the insoluble 1-(2,6-xylyl)-5-(p-methoxyphenyl) - pyrrole-2-propionic acid which separates is collected and washed with petroleum ether; M.P. 129–132° C. following crystallization from aqueous ethanol.

A suspension of 5 g. of 1-(2,6-xylyl)-5-(p-methoxyphenyl)-pyrrole-2-propionic acid in 250 ml. of warm water is titrated with 143 ml. of 0.1 normal sodium hydroxide solution and the resulting solution is filtered. The filtrate is evaporated to dryness to give 1-(2,6-xylyl)-5-(p-methoxyphenyl)-pyrrole-2-propionic acid sodium salt. The potassium, ammonium and ethanolamine salts are prepared by reaction of the free acid with, respectively, potassium hydroxide solution, aqueous ammonia and 2-hydroxyethylamine solution.

Lower alkyl esters of 1-(2,6-xylyl)-5-(p-methoxyphenyl)-pyrrole-2-propionic acid are prepared by heating the acid in a lower alkanol containing a small amount of p-toluenesulfonic acid; methyl ester, M.P. 79–80° C.; ethyl ester, M.P. 39–40° C.

Example 2

A solution of 11.5 g. of 6-(p-ethoxybenzoyl)-4-oxohexanoic acid, 5.2 ml. of 2,6-dimethylaniline and 10 mg. of p-toluenesulfonic acid in 50 ml. of toluene is heated under reflux for 26 hours with continuous removal of the water formed in the condensate. The reaction mixture is cooled and the insoluble 1-(2,6-xylyl)-5-(p-ethoxyphenyl)-pyrrole-2-propionic acid which separates is collected on a filter and washed with benzene and with petroleum ether; M.P. 144–146° C. following crystallization from aqueous ethanol.

A solution of 2.0 g. of 1-(2,6-xylyl) - 5 - (p-ethoxyphenyl)-pyrrole-2-propionic acid, 10.0 ml. of absolute ethanol and 0.1 g. of p-toluenesulfonic acid is heated under reflux for 4 hours. The solution is concentrated and the insoluble 1-(2,6-xylyl)-5-(p-ethoxyphenyl)-pyrrole-2-propionic acid ethyl ester which separates is collected; M.P. 82–83° C. following crystallization from aqueous ethanol. By the same procedure, with the substitution of methanol for the ethanol, the corresponding methyl ester is obtained, M.P. 86–88° C.

A mixture of 1 g. of 1-(2,6-xylyl)-5-(p-ethoxyphenyl)-pyrrole-2-propionic acid ethyl ester, 0.5 g. of potassium hydroxide and 25 ml. of 50% aqueous methanol is heated under reflux for 2 hours and diluted with 75 ml. of water. The resulting solution of 1-(2,6-xylyl)-5-(p-ethoxyphenyl)-pyrrole-2-propionic acid potassium salt is acidified with dilute hydrochloric acid and the insoluble 1 - (2,6 - xylyl) - 5 - (p - ethoxyphenyl) - pyrrole - 2 - propionic acid is collected; M.P. 144–146° C. following crystallization from aqueous ethanol.

The starting material can be obtained as follows. Equimolar quantities of p-ethoxyacetophenone and 2-furaldehyde are gradually added with stirring and external cooling to a 1% solution of sodium methoxide in methanol to give 4'-ethoxy-3-(2-furyl)-acrylophenone; M.P. 78–80° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. Alternatively, the compound is boiled with about 5 times its weight of a solution of 2 parts by volume of ethanol to 1 part by volume of hydrochloric acid for about 16 hours, the ethanol is distilled off and the residue is boiled with a mixture of 4 parts of water, 1 part of hydrochloric acid and 1 part of acetic acid. The product is 6-(p-ethoxybenzoyl)-4-oxohexanoic acid; M.P. 129–131° C.

Example 3

A solution of 10.0 g. of 6-(p-methoxybenzoyl)-4-oxohexanoic acid and 4.3 ml. of o-methoxyaniline in 50 ml. of glacial acetic acid is heated under reflux for 1 hour and diluted with 40 ml. of hot water. The mixture is cooled and the insoluble 1-(o-methoxyphenyl)-5-(p-methoxyphenyl)-pyrrole-2-propionic acid which separates is collected and washed with aqueous acetic acid; M.P. 171–173° C. following crystallization from benzene.

The following salts are obtained by reaction with the appropriate bases: sodium salt (with ethanol of crystallization), decomposes from 170° C.; calcium salt (monohydrate), darkens from 170° C., decomposes from 235° C.; ethanolamine salt, M.P. 118–120° C.; diethanolamine salt, M.P. 125–126° C.; triethanolamine salt, M.P. 68–70° C.

The lower alkyl esters of 1-(o-methoxyphenyl)-5-(p-methoxyphenyl)-pyrrole-2-propionic acid are prepared by heating the acid in a lower alkanol containing a small amount of p-toluenesulfonic acid; methyl ester, M.P. 105–106° C.; ethyl ester, M.P. 93–95° C.

Example 4

A solution of 7.0 g. of 6-(p-methoxybenzoyl)-4-oxohexanoic acid and 2.5 ml. of p-fluoroaniline in 35 ml. of toluene is heated under reflux for 2 hours with continuous removal of the water formed in the condensate. The mixture is cooled and the insoluble 1-(p-fluorophenyl)-5-(p-methoxyphenyl) - pyrrole-2-propionic acid which separates is collected on a filter and washed with benzene and with petroleum ether; M.P. 163–166° C. following crystallization from aqueous ethanol.

By the foregoing procedure with the substitution of an equivalent amount of 2,5-difluoroaniline for the p-fluoroaniline, the produce obtained is 1-(2,5-difluorophenyl)-5-(p-methoxyphenyl)-pyrrole-2-propionic acid; M.P. 130–132° C.

A solution of 2.0 g. of 1-(2,5-difluorophenyl)-5-(p-methoxyphenyl)-pyrrole-2-propionic acid, 10.0 ml. of methanol and 0.1 g. of p-toluenesulfonic acid is heated under reflux for 4 hours. The solution is concentrated and chilled and the insoluble 1-(2,5-difluorophenyl)-5-(p-methoxyphenyl)-pyrrole-2-propionic acid methyl ester which separates is collected; M.P. 69–70° C. following crystallization from methanol. The ethyl ester is prepared similarly by heating the free acid with ethanol containing a small amount of p-toluenesulfonic acid, M.P. 59–61° C.

Lower alkyl esters of 1-(p-fluorophenyl)-5-(p-methoxyphenyl)-pyrrole-2-propionic acid are prepared by heating the acid in a lower alkanol containing a small amount of p-toluenesulfonic acid; methyl ester, M.P. 94–96° C.

Example 5

A solution of 10.0 g. of 6-(p-methoxybenzoyl)-4-oxohexanoic acid and 4.1 ml. of o-toluidine in 50 ml. of toluene is heated under reflux for 22 hours with continuous removal of the water formed in the condensate. The reaction mixture is cooled and the insoluble 1-(o-tolyl)-5-(p-methoxyphenyl)-pyrrole - 2 - propionic acid which separates is collected; M.P. 130–132° C. following crystallization from ethanol.

By the same procedure with the substitution of an equivalent amount of 3-chloro-o-toluidine for the o-toluidine, the product obtained is 1-(3-chloro-o-tolyl)-5-(p-methoxyphenyl)-pyrrole-2-propionic acid; M.P. 136–138° C.

Example 6

A solution of 10.0 g. of 6-(p-ethoxybenzoyl)-4-oxohexanoic acid, 3.9 g. of o-toluidine and 10 mg. of p-toluenesulfonic acid in 50 ml. of toluene is heated under reflux for 22 hours with continuous removal of the water formed in the condensate. The mixture is cooled and the insoluble 1-(o-tolyl)-5-(p-ethoxyphenyl)-pyrrole-2-propionic acid which separates is collected on a filter and washed with benzene and with petroleum ether; M.P. 134–136° C. following crystallization from ethanol.

Lower alkyl esters of 1-(o-tolyl)-5-(p-ethoxyphenyl)-pyrrole-2-propionic acid are prepared by heating the acid with a lower alkanol containing a small amount of p-toluenesulfonic acid; methyl ester, M.P. 94–96° C.; ethyl ester, M.P. 69–70° C.

Example 7

A solution of 10.0 g. of 6-(p-ethoxybenzoyl)-4-oxohexanoic acid, 5.1 g. of 2-chloro-6-methylaniline and 10 mg. of p-toluenesulfonic acid in 50 ml. of toluene is heated under reflux for 26 hours with continuous removal of the water formed in the condensate. The reaction mixture is cooled and the insoluble 1-(6-chloro-o-tolyl)-5-(p-ethoxyphenyl)-pyrrole-2-propionic acid which separates is collected on a filter; M.P. 145–147° C. following crystallization from ethanol.

By the same procedure the reaction of 10.0 g. of 6-(p-methoxybenzoyl)-4-oxohexanoic acid and 5.4 g. of 2-chloro-6-methylaniline yields 1-(6-chloro-o-tolyl) - 5-(p-methoxyphenyl)-pyrrole-2-propionic acid; M.P. 143–146° C. following crystallization from isopropyl alcohol.

Lower alkyl esters of 1-(6-chloro-o-tolyl)-5-(p-ethoxyphenyl)-pyrrole-2-propionic acid are obtained by heating the acid in a lower alkanol containing a small amount of p-toluenesulfonic acid; methyl ester, M.P. 111–113° C.

Example 8

A stirred solution of 10.0 g. of 1-(2,6-xylyl)-5-(p-hydroxyphenyl)-pyrrole-2-propionic acid and 3.3 g. of sodium methoxide in 50 ml. of methanol is treated slowly with 6.8 ml. of n-propyl iodide. The mixture is heated under reflux for 4 hours, diluted with 50 ml. of water and 5 ml. of 50% sodium hydroxide solution and heated under reflux for an additional 4 hours. The resulting solution is added gradually with stirring to 10 ml. of concentrated hydrochloric acid in 100 ml. of water. The insoluble 1-(2,6-xylyl) - 5 - (p-propoxyphenyl)-pyrrole-2-propionic acid which separates is collected on a filter and washed with water; M.P. 133–135° C. following crystallization from aqueous ethanol and from cyclohexane.

By the foregoing procedure with the substitution of isopropyl iodide for the n-propyl iodide, the product obtained is 1-(2,6-xylyl)-5-(p-isopropoxyphenyl)-pyrrole-2-propionic acid; M.P. 167–169° C.

By the foregoing procedure with the substitution of 7.9 ml. of n-butyl iodide for the n-propyl iodide, the product obtained is 1-(2,6-xylyl) - 5 - (p-butoxyphenyl)-pyrrole-2-propionic acid; M.P. 124–126° C.

By the foregoing procedure with the substitution of an equivalent amount of dimethyl sulfate for the alkyl iodide, the product obtained is 1-(2,6-xylyl)-5-(p-methoxyphenyl)-pyrrole-2-propionic acid; M.P. 129–132° C.

Lower alkyl esters of 1-(2,6-xylyl)-5-(p-alkoxyphenyl)-pyrrole-2-propionic acids are obtained by heating the acid in a lower alkanol containing a small amount of p-toluensulfonic acid; 1-(2,6-xylyl)-5-(p-isopropoxyphenyl)-pyrrole-2-propionic acid methyl ester, M.P. 89–90° C.

The starting material can be obtained as follows. 70 g. of 50% sodium hydroxide solution is added with shaking to a solution of 34 g. of p-hydroxyacetophenone and 24 g. of 2-furaldehyde in 300 ml. of ethanol. The mixture is cooled and acidified with acetic acid to yield 3-(2-furyl)-4'-hydroxyacrylophenone; M.P. 160–162° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. Alternatively the compound is boiled with about 5 times its weight of a solution of 2 parts by volume of ethanol to 1 part by volume of hydrochloric acid for about 16 hours, the ethanol is distilled off and the residue is boiled with a mixture of 4 parts of water, 1 part of hydrochloric acid and 1 part of acetic acid. The product is 6-(p-hydroxybenzoyl)-4-oxohexanoic acid, M.P. 142–144° C. A solution of 10.0 g. of 6-(p-hydroxybenzoyl)-4-oxohexanoic acid, 5.0 ml. of 2,6-dimethylaniline and 10 mg. of p-toluenesulfonic acid in 50 ml. of glacial acetic acid is heated under reflux for 19 hours, stirred with charcoal, filtered and diluted with 70 ml. of hot water. The 1-(2,6-xylyl)-5-(p-hydroxyphenyl)-pyrrole-2-propionic acid which separates on cooling is collected on a filter; crystalline modifications M.P. 149–151° C. or M.P. 172–173° C. following crystallization from ethyl acetate-petroleum ether.

Example 9

A solution of 10.0 g. of 6-(p-methoxybenzoyl)-4-oxohexanoic acid, 5.3 g. of o-methylthioaniline, and 10 mg. of p-toluenesulfonic acid in 50 ml. of toluene is heated under reflux for 18 hours with continuous removal of the water formed in the condensate. The reaction mixture is cooled and the 1-(o-methylthiophenyl) - 5 - (p-methoxyphenyl)-pyrrole-2-propionic acid which separates is collected and washed with benzene and petroleum ether; M.P. 148–149° C. following crystallization from aqueous ethanol.

Example 10

A solution of 4.1 g. of 6-(p-ethoxybenzoyl)-4-oxohexanoic acid and 2.1 g. of o-methylthioaniline in 25 ml. of glacial acetic acid is heated under reflux for 6 hours, cooled and diluted with 25 ml. of water. The insoluble 1-(o-methylthiophenyl) - 5 - (p-ethoxyphenyl)-pyrrole-2-propionic acid which separates is collected; M.P. 158.5–159.5° C. following crystallization from aqueous ethanol.

Example 11

A solution of 9.0 g. of 6-(p-methoxybenzoyl)-4-oxohexanoic acid and 4.3 g. of 4-fluoro-m-toluidine in 40 ml. of toluene is heated under reflux for 3 hours with continuous removal of the water formed in the condensate. The mixture is cooled and the insoluble 1-(4-fluoro-m-tolyl) - 5 - (p-methoxyphenyl)-pyrrole-2-propionic acid which separates is collected and washed with benzene and petroleum ether; M.P. 122–125° C. following crystallization from aqueous ethanol.

By the foregoing procedure, with the substitution of 6-(p-ethoxybenzoyl)-4-oxohexanoic acid for the 6-(p-methoxybenzoyl)-4-oxohexanoic acid, the product obtained is 1-(4-fluoro-m-tolyl)-5-(p-ethoxyphenyl)-pyrrole-2-propionic acid, M.P. 167–169° C.

Example 12

A solution of 10.0 g. of 6-(p-methoxybenzoyl)-4-oxohexanoic acid, 5.5 g. of α-naphthylamine and 10 mg. of p-toluenesulfonic acid in 50 ml. of toluene is heated under reflux for 5 hours with continuous removal of the water formed in the condensate. The mixture is cooled and the insoluble 1-(α-naphthyl)-5-(p-methoxyphenyl)-pyrrole-2-propionic acid which separates is collected and washed with petroleum ether; M.P. 183.5–186° C. following crystallization from ethanol.

By the foregoing procedure, with the substitution of 6-(p-ethoxybenzoyl)-4-oxohexanoic acid for the 6-(p-methoxybenzoyl)-4-oxohexanoic acid, the product obtained is 1-(α-naphthyl)-5-(p-ethoxyphenyl)-pyrrole-2-propionic acid, M.P. 168–171° C.

Example 13

A solution of 10.0 g. of 6-(p-methoxybenzoyl)-4-oxohexanoic acid and 4.2 g. of o-fluoroaniline in 50 ml. of glacial acetic acid is heated under reflux for 6 hours and diluted with 50 ml. of hot water. The mixture is cooled and the insoluble 1-(o-fluorophenyl)-5-(p-methoxyphenyl)-pyrrole-2-propionic acid which separates is collected and washed with aqueous acetic acid; M.P. 138–140° C. following crystallization from aqueous ethanol.

I claim:
1. A member of the class consisting of compounds of the formula

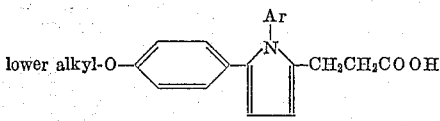

non-toxic salts of said compounds and lower alkyl esters of said compounds; where Ar is a member of the class consisting of o-tolyl, 3-chloro-o-tolyl, 6-chloro-o-tolyl, 2,6-xylyl, o-methoxyphenyl, p-fluorophenyl, 2,5-difluorophenyl, o-methylthiophenyl, 4-fluoro-m-tolyl, α-naphthyl, and o-fluorophenyl.

2. 1-(o-methoxyphenyl) - 5 - (p - lower alkoxyphenyl)-pyrrole-2-propionic acid.
3. 1-(o-methoxyphenyl) - 5 - (p-methoxyphenyl)-pyrrole-2-propionic acid.
4. 1-(2,6-xylyl)-5-(p-lower alkoxyphenyl)-pyrrole-2-propionic acid.
5. 1-(2,6-xylyl) - 5 - (p-ethoxyphenyl)-pyrrole-2-propionic acid.
6. 1-(2,5-difluorophenyl) - 5 - (p-methoxyphenyl)-pyrrole-2-propionic acid.

References Cited in the file of this patent

Blicke et al.: "J. Am. Chem. Society," pages 1675–77, vol. 66 (1944).
Holdsworth et al.: "Chemical Abstracts," page 6653[3], vol. 31 (1937).